No. 645,529. Patented Mar. 13, 1900.
O. LONG.
SELF LOCKING WAGON JACK.
(Application filed Aug. 4, 1899.)
(No Model.)
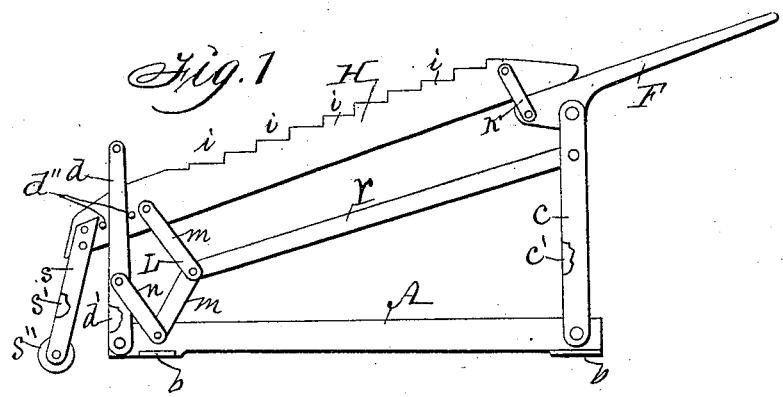
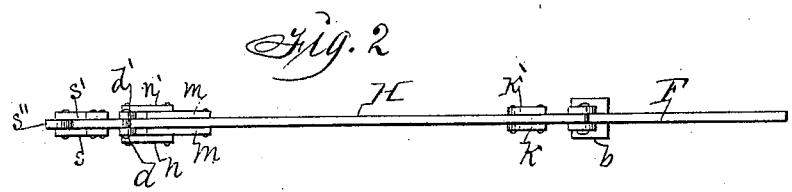
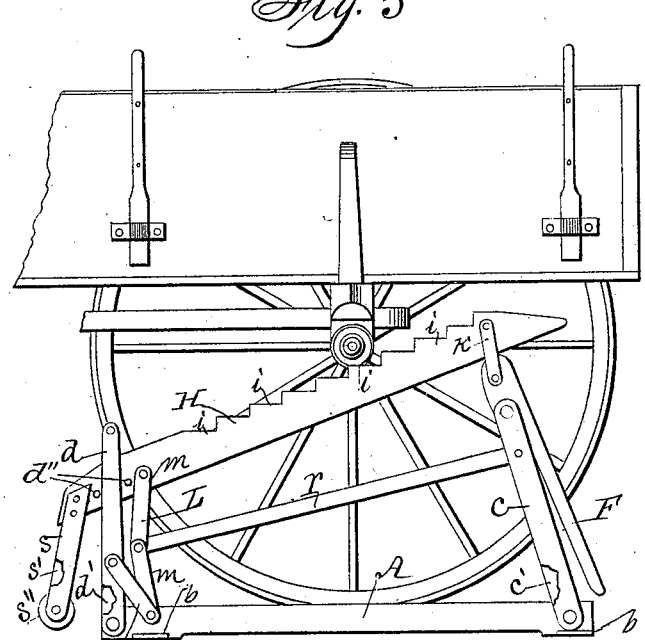
Witnesses:
H.C. Stuart
R.S. Orwig
Inventor:
Obed Long
By Thomas G. Orwig, Atty.
THE NORRIS PETERS CO., PHOTO-LITHO., WASHINGTON, D.C.

UNITED STATES PATENT OFFICE.

OBED LONG, OF MARSHALLTOWN, IOWA.

SELF-LOCKING WAGON-JACK.

SPECIFICATION forming part of Letters Patent No. 645,529, dated March 13, 1900.

Application filed August 4, 1899. Serial No. 726,107. (No model.)

*To all whom it may concern:*

Be it known that I, OBED LONG, a citizen of the United States, residing at Marshalltown, in the county of Marshall and State of Iowa, have invented a new and useful Self-Locking Wagon-Jack, of which the following is a specification.

My object is to provide a strong, durable, and efficient self-locking compound-lever wagon-jack specially adapted for lifting and securely supporting wagons when heavily loaded.

My invention consists in the construction, arrangement, and combination of parts, as hereinafter set forth, pointed out in my claim, and illustrated in the accompanying drawings, in which—

Figure 1 is a side view showing the parts adjusted relative to each other as required to be placed under the axle of a vehicle preparatory to lifting the axle and taking off the wheel. Fig. 2 is a top view of my invention as shown in Fig. 1. Fig. 3 shows my invention as applied to practical use and the operative parts in locked position.

The letter A designates the base, consisting of a straight and flat bar that is broader at its ends than at its intermediate or body portion and has short cross-pieces $b$ fixed thereto to serve as feet, that may vary in width as required to retain the complete device in an upright position. An upright composed of two mating parts $c$ and $c'$ is pivotally connected with one end of the base A, and an upright composed of two parts $d$ and $d'$ is connected with the other end by means of bolts in such a manner that the mating parts will not contact. A lever F of the first order is fulcrumed between the top ends of the upright at the front end of the base A. A straight flat bar H, stepped at its top edge to provide a plurality of rests $i$ for supporting axles at different height, is extended between the parts $d$ and $d'$ of the rear upright and pivotally connected with the short arm of the lever F by means of links $k$ and $k'$. Pins $d''$, fixed in the lower end portion of the bar H, engage the upright $d$ as required to prevent longitudinal movement of said bar relative to said upright. A toggle-jointed lever L, composed of straight parts $m$, is pivotally connected at its top end with the stepped bar H, at its bottom with the rear upright by means of links $n$, and at its center with the top portion of the front upright by a straight bar $r$, as clearly shown in Figs. 1 and 3. A wheel-support composed of two mating parts $s$ and $s'$ is fixed to the rear end of the stepped bar H and a wheel $s''$, mounted between their lower ends in such a manner that a person can take hold of the lever F and lift it, so that the weight of the jack will rest upon the wheel, so that it can be moved about advantageously in placing it under the axle of a wagon, and when in proper position relative to the axle of a wagon bearing down the long arm of the lever F will actuate the toggle-jointed lever L as required for elevating the stepped bar H, and thereby the axle of a wagon, as shown in Fig. 3, as required for taking off a wagon-wheel, and as the bar H ascends the wheel $s''$ is lifted off the floor or ground, and the extended base A will rest securely thereon as required to prevent the jack from tilting when it is supporting an axle in an elevated position, and the toggle-jointed lever will be in a locked position, as shown, by reason of its center having passed the dead-point in its orbit.

It is obvious wood or metal may be used in the construction of my invention and jacks may vary in size, weight, and power for different vehicles.

Having thus described the construction and operation of my invention, its practical use and utility will be readily understood by persons familiar with the art to which it pertains, and

What I therefore claim as new, and desire to secure by Letters Patent, is—

A wagon-jack comprising a straight bar for a base, an upright pivotally connected with each end portion of said bar, a lever of the first order pivoted to the top of the front upright, a toggle-jointed lever connected with the rear upright, a straight bar stepped in its top edge linked to the short arm of the lever of the first order and pivotally and slidingly connected with the rear upright, and a straight bar pivotally connected with the center of the toggle-jointed lever and the top portion of the front upright, arranged and combined to operate in the manner set forth and for the purposes stated.

OBED LONG.

Witnesses:
J. C. TUFFREE,
JOS. TUFFREE.